(12) United States Patent
Meyer et al.

(10) Patent No.: US 9,234,585 B2
(45) Date of Patent: Jan. 12, 2016

(54) TRANSMISSION HOUSING

(75) Inventors: Scott Patrick Meyer, Washington, IL (US); Brian James Oleson, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 975 days.

(21) Appl. No.: 12/972,735

(22) Filed: Dec. 20, 2010

(65) Prior Publication Data
US 2012/0157258 A1    Jun. 21, 2012

(51) Int. Cl.
*F16H 57/02* (2012.01)
*F16H 63/30* (2006.01)
*F16H 57/08* (2006.01)

(52) U.S. Cl.
CPC ............ *F16H 63/3026* (2013.01); *F16H 57/02* (2013.01); *F16D 2300/26* (2013.01); *F16H 2057/02047* (2013.01); *F16H 2057/087* (2013.01); *Y10T 29/49464* (2015.01)

(58) Field of Classification Search
USPC ........................................ 74/434, 437, 606 R
See application file for complete search history.

(56) References Cited

U.S. PATENT DOCUMENTS

| | | |
|---|---|---|
| 1,472,114 A | 10/1923 | Browne |
| 1,872,250 A | 8/1932 | Coughtry |
| 2,935,169 A | 5/1960 | Mills |
| 3,527,121 A | 9/1970 | Moore |
| 3,730,664 A | 5/1973 | Hultgren |
| 3,881,365 A | 5/1975 | Hardy |
| 3,905,252 A | 9/1975 | Zaiser |
| 4,019,406 A | 4/1977 | Herr |
| 4,023,439 A | 5/1977 | Herr |
| 4,129,050 A | 12/1978 | Akashi et al. |
| 4,155,276 A | 5/1979 | Fengler |
| 4,440,282 A | 4/1984 | Ishimaru et al. |
| 4,449,621 A | 5/1984 | F'Geppert |
| 4,566,571 A | 1/1986 | Fujioka |
| 4,724,745 A | 2/1988 | Sumiya et al. |
| 5,009,290 A | 4/1991 | Harada et al. |
| 5,137,131 A | 8/1992 | Enomoto |
| 5,384,949 A | 1/1995 | Wodrich et al. |
| 5,881,856 A * | 3/1999 | Prater .......................... 192/48.1 |
| 5,992,597 A | 11/1999 | Nagai et al. |
| 6,227,340 B1 | 5/2001 | Braford, Jr. |
| 6,508,094 B1 | 1/2003 | Gotou et al. |
| 6,758,786 B2 | 7/2004 | Lepelletier |
| 7,556,131 B2 | 7/2009 | Seipold |
| 7,694,792 B2 | 4/2010 | Tsukada et al. |
| 2004/0094383 A1 | 5/2004 | Kinoshita et al. |
| 2009/0318257 A1* | 12/2009 | Hawkins ........................ 475/331 |
| 2011/0067971 A1* | 3/2011 | Ratner .......................... 192/70.2 |

FOREIGN PATENT DOCUMENTS

JP    2007247894    9/2007

* cited by examiner

*Primary Examiner* — Justin Holmes
(74) *Attorney, Agent, or Firm* — Finnegan, Henderson, Farabow, Garrett & Dunner, LLP

(57) ABSTRACT

A transmission housing includes an inner surface and circumferentially spaced first sets of teeth spaced about an axis of the transmission housing and configured to selectively engage a first clutch plate. Each first set is attached to the inner surface. The transmission housing also includes circumferentially spaced second sets of teeth spaced about the axis of the transmission housing and configured to selectively engage a second clutch plate. Each second set is attached to the inner surface. The teeth of at least one of the first or second sets extend axially and are narrower at a first axial end of the respective teeth than at a second axial end of the respective teeth.

20 Claims, 8 Drawing Sheets

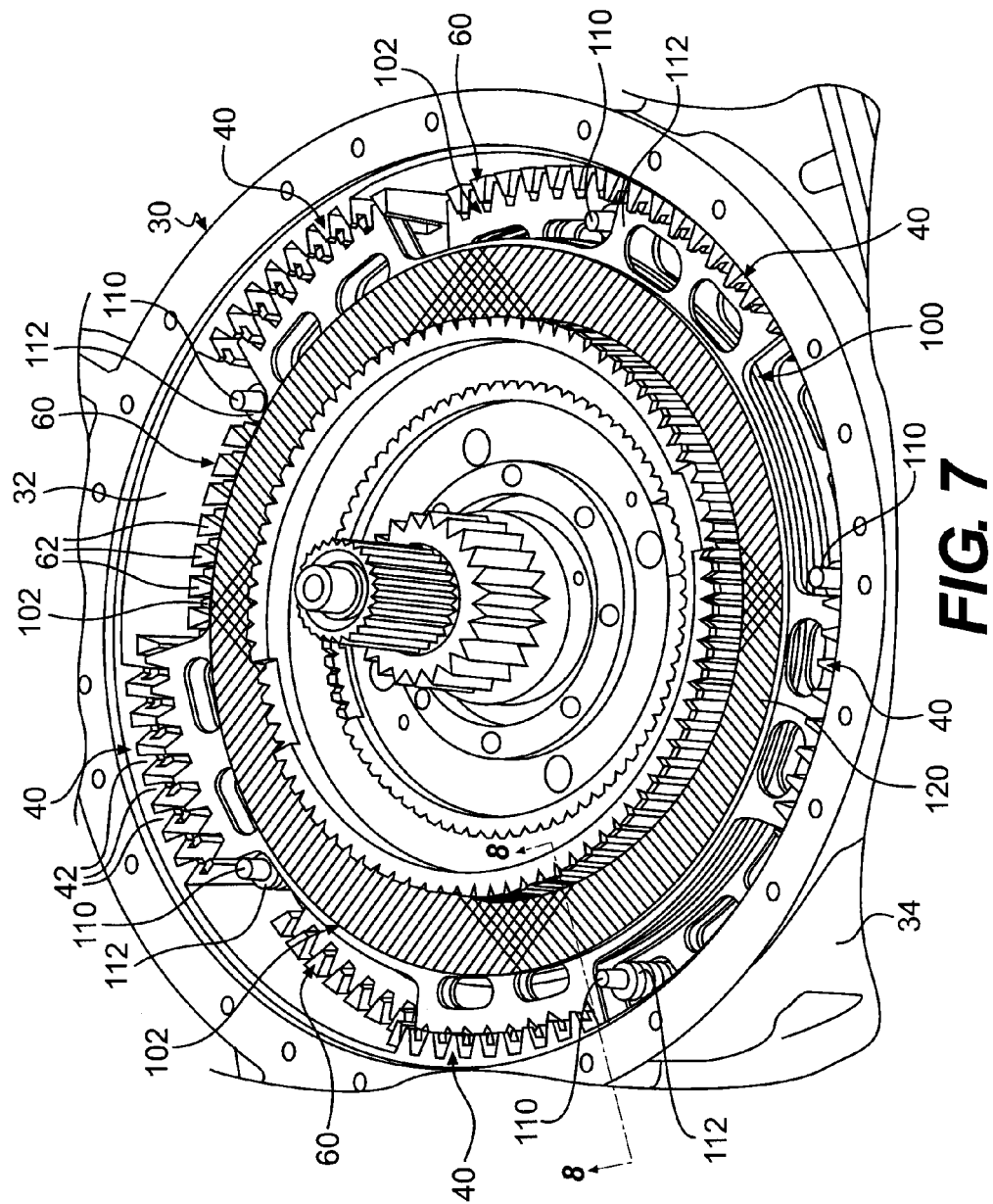

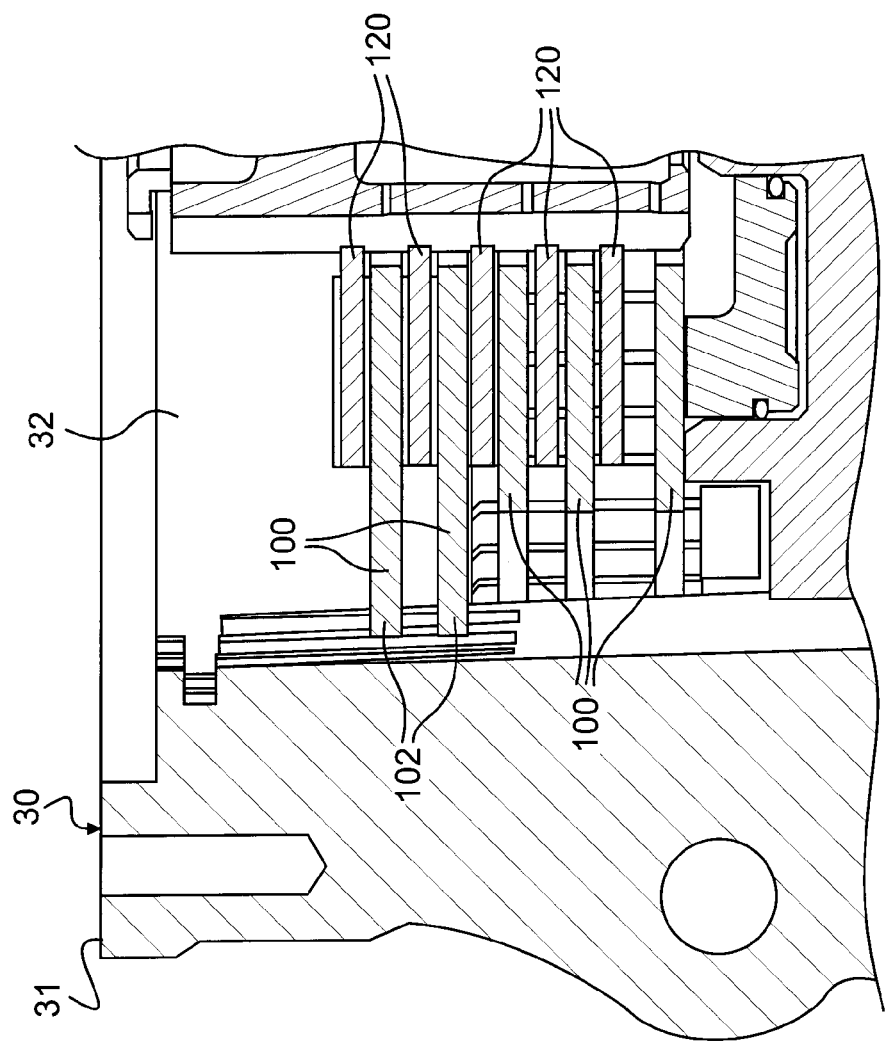

TRANSMISSION HOUSING

TECHNICAL FIELD

The present disclosure relates generally to a transmission, and more particularly, to a transmission housing.

BACKGROUND

Transmissions, such as planetary transmissions, can include one or more clutch or brake assemblies that tie two rotating components together or to a ground member, such as a housing of the transmission. Different gear ratios can be obtained by engaging the various clutch assemblies. When a particular clutch assembly is engaged, a reactive torque may be transmitted to the transmission housing.

Conventional transmissions may include a series of clutch teeth that protrude inwardly from an inner surface of the transmission housing. The clutch teeth may couple the clutch assemblies to the transmission housing. As a result, torque may be transmitted directly to the transmission housing via the clutch teeth.

A conventional transmission housing that includes clutch teeth extending inwardly from an inner surface of the transmission housing is described in U.S. Pat. No. 7,556,131 (the '131 patent) issued to Siepold et al. The transmission housing of the '131 patent includes circumferentially and axially spaced teeth that extend inwardly from the inner surface of the transmission housing. Although the transmission housing of the '131 patent may include teeth that extend inwardly from the inner surface of the transmission housing in order to couple one or more clutch assemblies to the transmission housing, the teeth have a substantially constant cross-section along the axial direction. As a result, the transmission housing of the '131 patent may be more difficult to cast and may require a more complex and expensive mold when forming the transmission housing by casting. Thus, the transmission housing of the '131 patent may be more expensive to manufacture.

The disclosed transmission housing is directed to overcoming one or more of the problems set forth above.

SUMMARY

In one aspect, the present disclosure is directed to a transmission housing. The transmission housing includes an inner surface and circumferentially spaced first sets of teeth spaced about an axis of the transmission housing and configured to selectively engage a first clutch plate. Each first set is attached to the inner surface. The transmission housing also includes circumferentially spaced second sets of teeth spaced about the axis of the transmission housing and configured to selectively engage a second clutch plate. Each second set is attached to the inner surface. The teeth of at least one of the first or second sets extend axially and are narrower at a first axial end of the respective teeth than at a second axial end of the respective teeth.

In one aspect, the present disclosure is directed to a transmission. The transmission includes a clutch assembly including at least one first clutch plate and at least one second clutch plate. The transmission also includes a housing with a first end, a second end, and an axis. The housing includes an inner surface and circumferentially spaced first sets of teeth spaced about the axis of the housing and configured to selectively engage the at least one first clutch plate. Each first set is integrally attached to the inner surface. The housing also includes circumferentially spaced second sets of teeth spaced about the axis of the housing and configured to selectively engage the at least one second clutch plate. Each second set is integrally attached to the inner surface. The teeth of at least one of the first or second sets extend axially and include at least a portion that is tapered along the axial direction.

In another aspect, the present disclosure is directed to a method of assembling a transmission having a transmission housing with an inner surface. The method includes forming circumferentially spaced first sets of teeth spaced about an axis of the transmission housing and configured to selectively engage at least one first clutch plate. Each first set is integrally attached to the inner surface of the transmission housing. The method also includes forming circumferentially spaced second sets of teeth spaced about the axis of the transmission housing and configured to selectively engage at least one second clutch plate. Each second set is integrally attached to the inner surface, and the teeth of at least one of the first or second sets are wider at a first axial location than at a second axial location that is offset axially from the first axial location.

BRIEF DESCRIPTION OF THE DRAWINGS

FIGS. 7 and 8 are a perspective view and a cross-sectional view, respectively, of friction plates and multiple clutch plates of FIG. 6 inside the central portion of the transmission housing of FIGS. 2 and 3.

DETAILED DESCRIPTION

Figure 1:
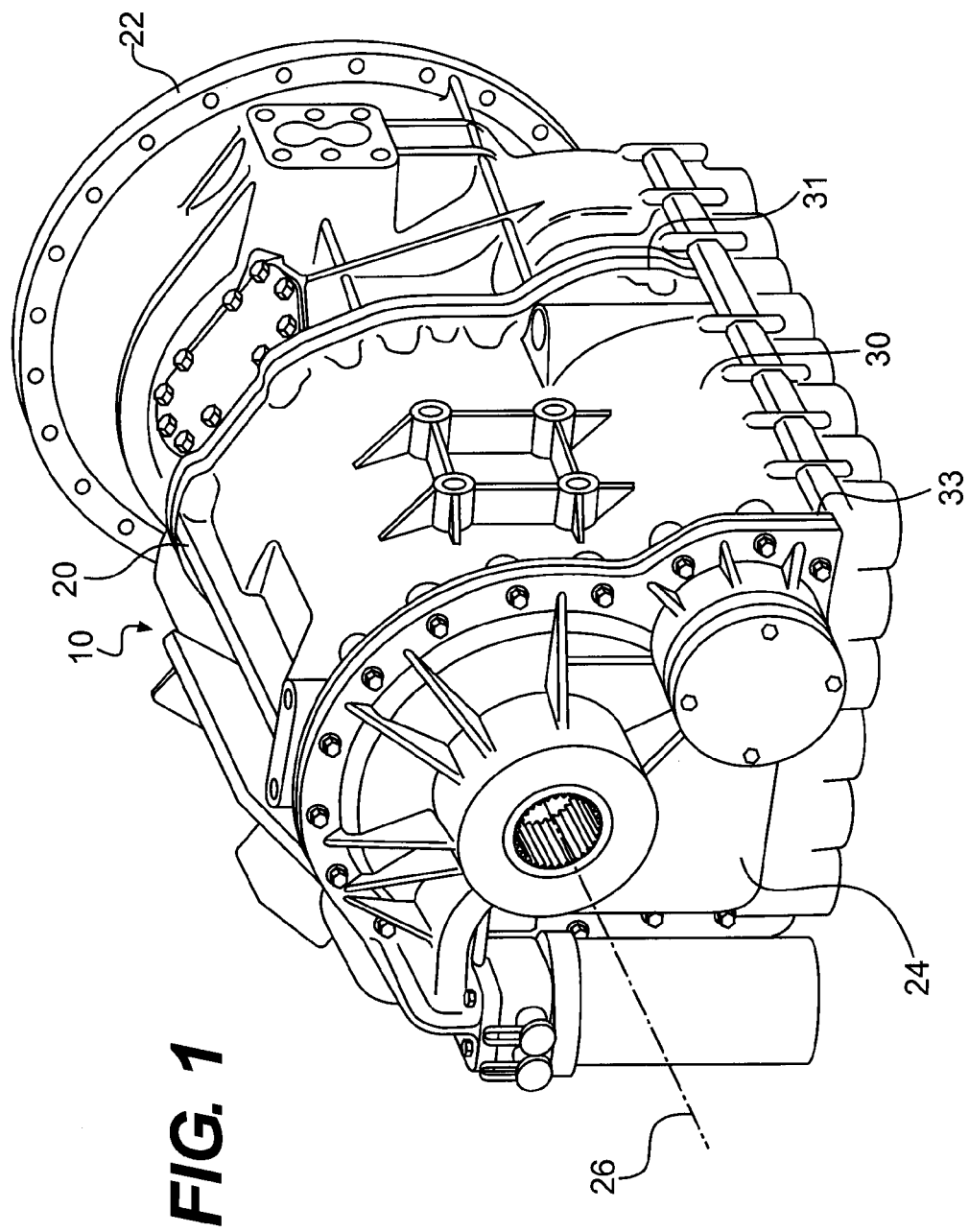
FIG. 1 is a perspective view of a transmission, according to an exemplary embodiment.

FIG. 1 illustrates an exemplary transmission 10. The transmission 10 may be provided in a machine (not shown) having multiple systems and components that cooperate to accomplish a task. The machine may embody a fixed or mobile machine that performs some type of operation associated with an industry such as mining, construction, farming, transportation, or any other industry known in the art. For example, the machine may be an earth moving machine such as an excavator, a dozer, a loader, a backhoe, a motor grader, a dump truck, or any other earth moving machine.

The transmission 10 may be coupled to an engine (not shown), which may be, for example, an internal combustion engine or any other type of engine known in the art. The engine and the transmission 10 may be mounted within an engine compartment of the machine and may be configured to supply power to elements of the machine by any conventional means. Alternatively, the transmission 10 may be coupled to a differential or mounted in the machine separately from the engine or the differential.

An input shaft or input member (not shown) of the transmission 10 may directly couple an output shaft of the engine. The transmission 10 includes a transmission housing 20 having a central portion 30 that may be positioned between a first end portion 22 and a second end portion 24. The housing 20 may include an axis 26. For example, as shown in FIG. 1, the housing 20 may be cylindrical. The central portion 30 may include a first axial end 31 that may attach to the first end portion 22 and a second axial end 33 that may attach to the second end portion 24.

Figure 2:
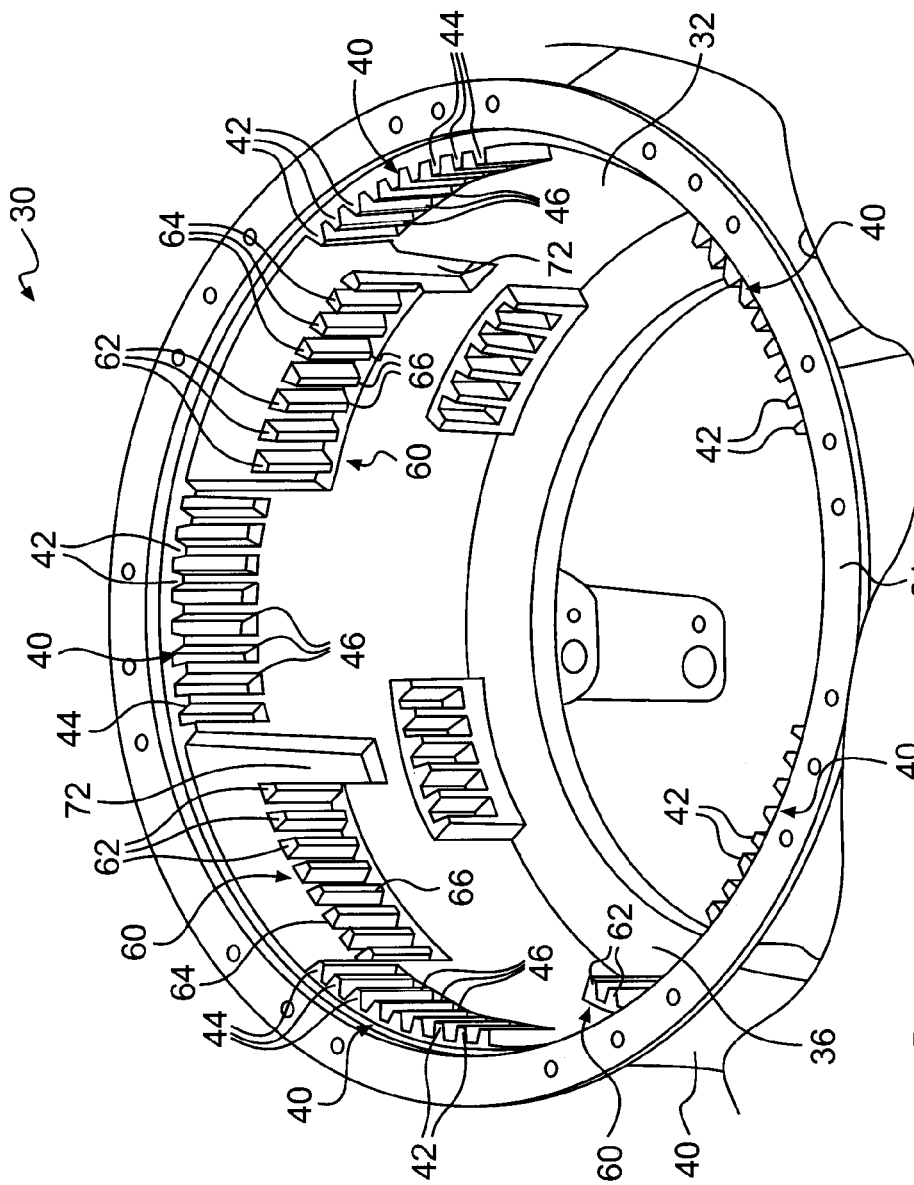
FIGS. 2 and 3 are perspective views of an inner surface of a central portion of a housing of the transmission of FIG. 1.
Figure 3:
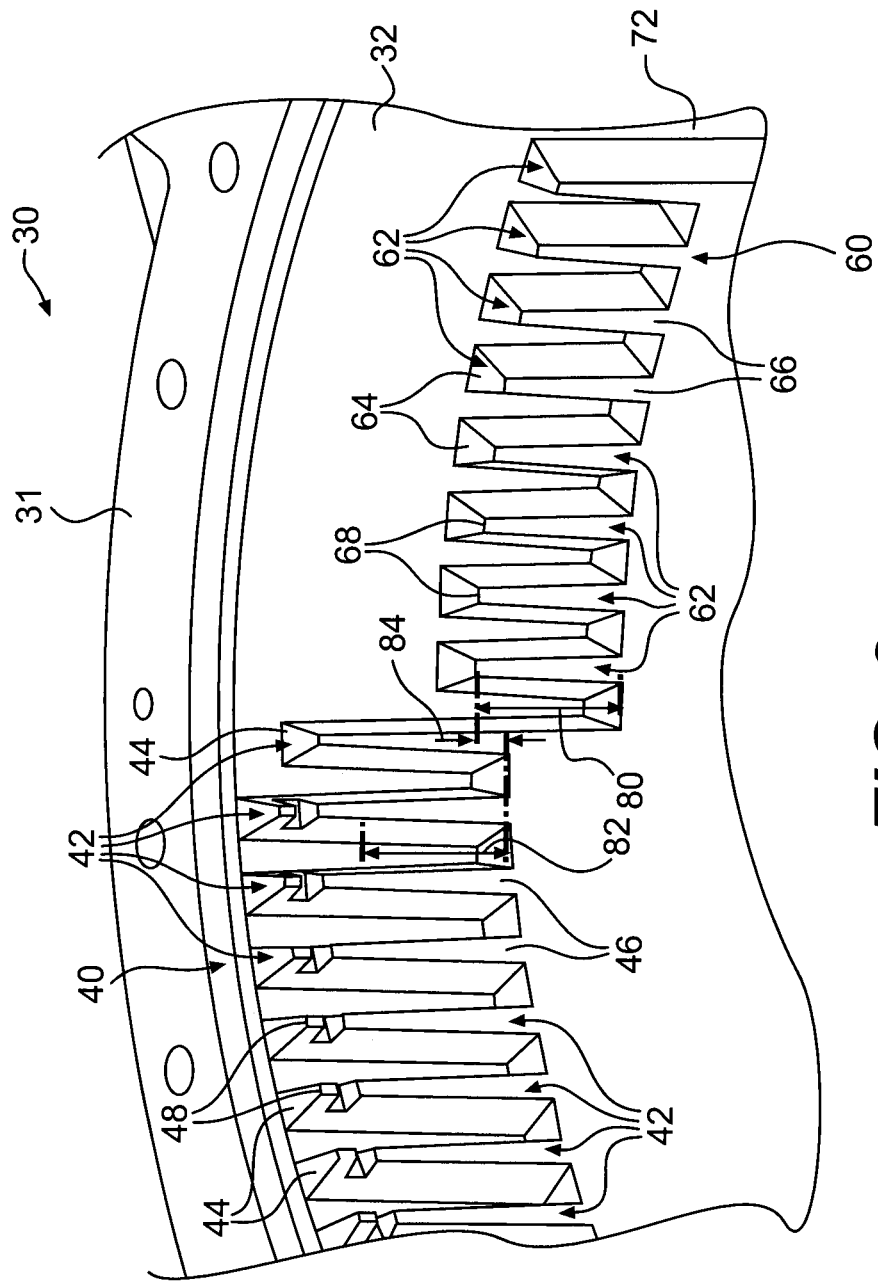

FIGS. 2 and 3 illustrate the central portion 30 of the housing 20 with the first and second end portions 22, 24 removed. The central portion 30 includes an inner surface 32 and an outer surface 34. The central portion 30 may also include circumferentially spaced inwardly extending first sets 40 of protrusions or clutch teeth 42 connected to the inner surface 32, and circumferentially spaced inwardly extending second sets 60 of protrusions or clutch teeth 62 connected to the inner surface 32. Optionally, additional circumferentially spaced inwardly extending sets of protrusions or clutch teeth may be connected to the inner surface 32, as shown in FIG. 2.

Optionally, the central portion 30 may include a wall 36 extending around a circumference of the central portion 30 on the inner surface 32. The wall 36 may separate the inner surface 32 into sides, and one of the sides may include the first and second sets 40, 60 of clutch teeth 42, 62 described above.

In the illustrated embodiment, the housing 20 includes five first sets 40 of the clutch teeth 42 and five second sets 60 of the clutch teeth 62, but it is envisioned that any number of sets may be used. For example, there may be fewer or more than five sets 40 of the clutch teeth 42 and/or fewer or more than five sets 60 of the clutch teeth 62, e.g., depending on the application. The first and second sets 40, 60 of the clutch teeth 42, 62 may be directly integrated into the housing 20 or attached thereto using any known fastener, such as bolts (not shown). For example, the clutch teeth 42, 62 may be formed integral with the central portion 30 of the housing 20 using a mold, such as by a casting process. Thus, the central portion 30 may be formed from a material used for casting, such as aluminum. Each clutch tooth 42, 62 may have a length extending generally in an axial direction, a width extending generally in a circumferential direction, and a height extending generally in a radial direction.

As shown in FIGS. 2 and 3, each clutch tooth 42 of the first sets 40 may extend generally axially, and may include a first axial end 44 and a second axial end 46. The first axial ends 44 of the clutch teeth 42 may be closer to the first axial end 31 of the central portion 30 than the second axial ends 46 of the clutch teeth 42, and the second axial ends 46 of the clutch teeth 42 may be closer to the second axial end 33 of the central portion 30 than the first axial ends 44 of the clutch teeth 42. The distance between the respective first and second axial ends 44, 46 defines an axial length of each clutch tooth 42. The first axial ends 44 may be axially aligned with each other and the second axial ends 46 may be axially aligned with each other.

Also, each clutch tooth 62 of the second sets 60 may extend generally axially, and may include a first axial end 64 and a second axial end 66. The first axial ends 64 of the clutch teeth 62 may be closer to the first axial end 31 of the central portion 30 than the second axial ends 66 of the clutch teeth 62, and the second axial ends 66 of the clutch teeth 62 may be closer to the second axial end 33 of the central portion 30 than the first axial ends 64 of the clutch teeth 62. The distance between the respective first and second axial ends 64, 66 defines an axial length of each clutch tooth 62. The first axial ends 64 may be axially aligned with each other and the second axial ends 66 may be axially aligned with each other. Spaces are interposed between each clutch tooth 42, 62, and each space extends along the axial length of the clutch teeth 42, 62 so that adjacent clutch teeth 42, 62 may not contact each other.

As shown in FIG. 2, the first and second sets 40, 60 of the clutch teeth 42, 62 may be connected to the central portion 30 of the housing 20 in an alternating or staggered fashion such that one of the first sets 40 is positioned circumferentially between two neighboring second sets 60 and one of the second sets 60 is positioned circumferentially between two neighboring first sets 40. Thus, neighboring first sets 40 may be separated by spaces that may extend circumferentially for at least the circumferential width of one of the second sets 60. Likewise, neighboring second sets 60 may be separated by spaces that may extend circumferentially for at least the circumferential width of one of the first sets 40. Thus, as shown in the illustrated embodiment of FIGS. 2 and 3, the first and second sets 40, 60 do not overlap circumferentially, the first sets 40 are circumferentially spaced from each other, and the second sets 60 are circumferentially spaced from each other. The first and second sets 40, 60, however, may overlap axially, as shown in FIGS. 2 and 3 and as will be described below.

As shown in FIGS. 2 and 3, each clutch tooth 42, 62 may be formed with axial draft, e.g., a taper along the axial direction. With the axial draft, each clutch tooth 42, 62 may be formed to continuously taper along the axial direction so that the clutch tooth 42, 62 is narrower at the first axial end 44, 64 and wider at the second axial end 46, 66 along any cross-section of the clutch tooth 42, 62 taken parallel to the axis 26. The spaces separating each clutch tooth 42, 62 may be continuously tapered along the axial direction so that each space is wider closer to the first axial ends 44, 64 of the clutch teeth 42, 62 and narrower closer to the second axial ends 46, 66 of the clutch teeth 42, 62 along any cross-section taken parallel to the axis 26.

Also, as shown in FIGS. 2 and 3, each clutch tooth 42, 62 may be formed with radial draft, e.g., a taper along the radial direction. With the radial draft, each clutch tooth 42, 62 may be formed to continuously taper along the radial direction so that the clutch tooth 42, 62 is narrower at an inner radial end 48, 68 or tip, and wider at an outer radial end where the clutch tooth 42, 62 joins the inner surface 32 of the central portion 30. The spaces separating each clutch tooth 42, 62 may be continuously tapered along the radial direction so that the space is wider closer to the inner radial ends 48, 68 of the clutch teeth 42, 62 and narrower closer to the outer radial ends where the clutch teeth 42, 62 join the inner surface 32 of the central portion 30.

The assembly of the transmission 10 using the central portion 30 of the housing 20 shown in FIGS. 2 and 3 will now be described in connection with FIGS. 4-8.

Figure 4:
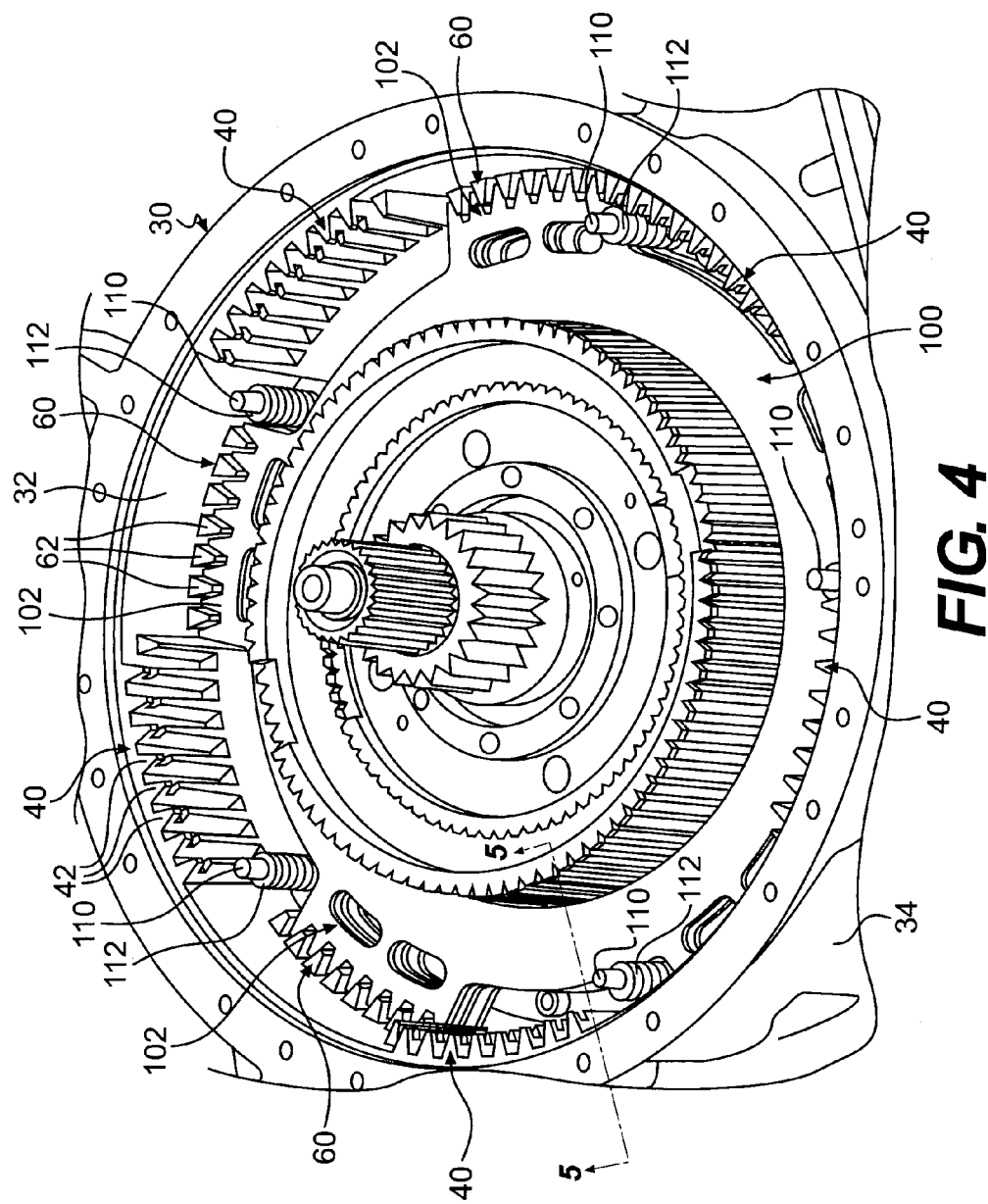
FIGS. 4 and 5 are a perspective view and a cross-sectional view, respectively, of multiple clutch plates inside the central portion of the transmission housing of FIGS. 2 and 3.
Figure 5:
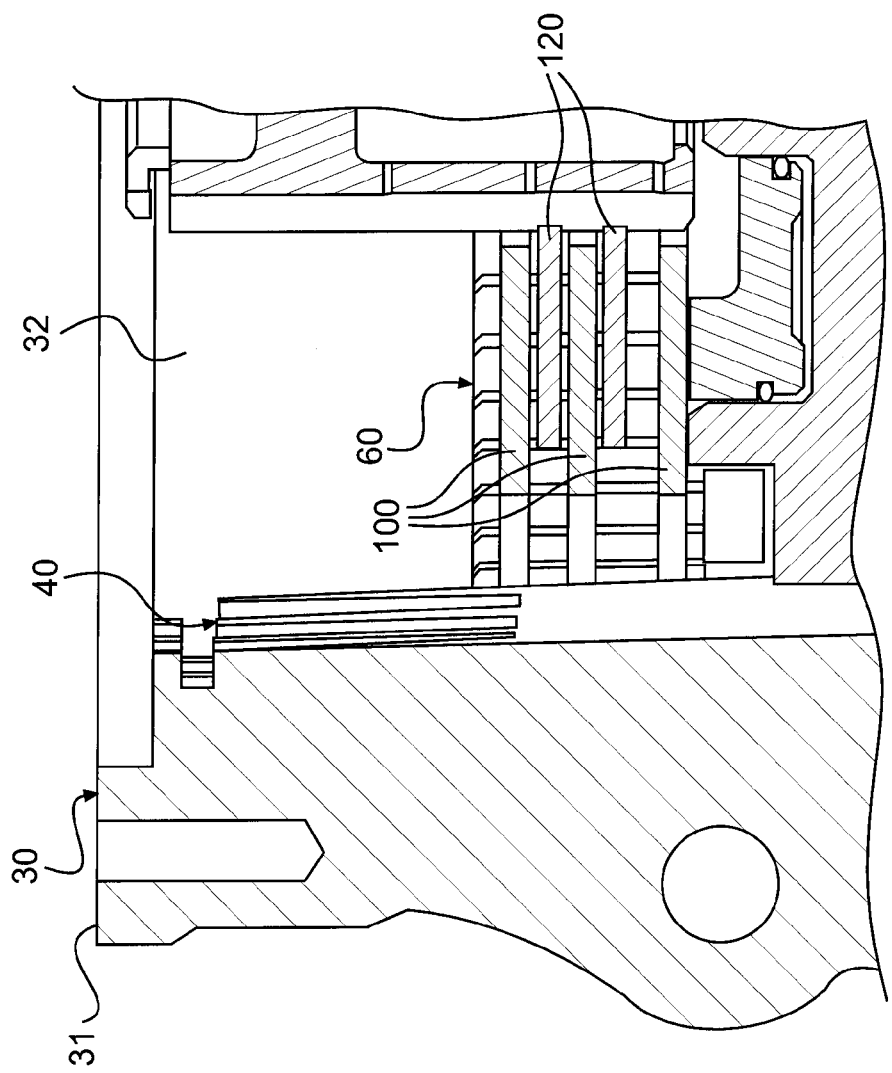

As shown in FIGS. 4 and 5, multiple clutch plates 100 may be inserted into the central portion 30 of the housing 20 so that clutch teeth 102 of the clutch plates 100 mesh with or engage the clutch teeth 62 of the second sets 60 in the central portion 30.

Figure 6:
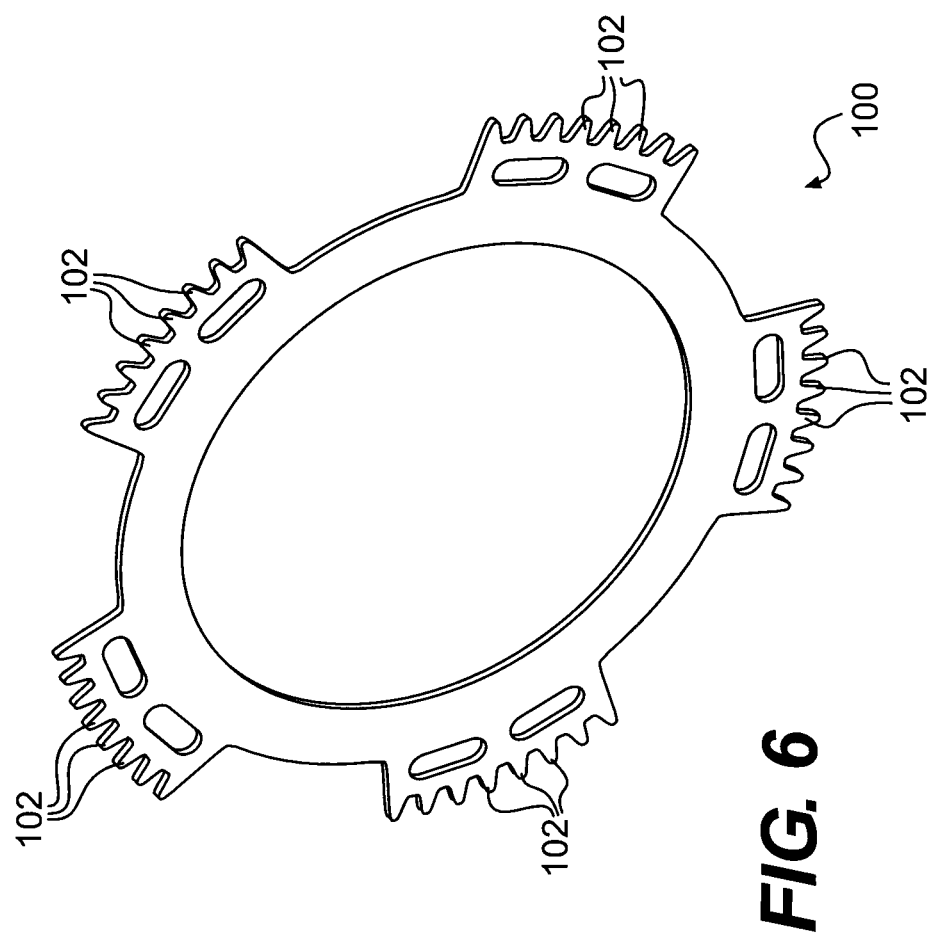
FIG. 6 is a perspective view of one of the clutch plates of FIGS. 4 and 5.

FIG. 6 illustrates the clutch plate 100 for inserting into the central portion 30 of the housing 20 to form the transmission 10, as shown in FIGS. 4 and 5. The clutch plate 100 includes sets of the clutch teeth 102 configured to engage either the clutch teeth 42 of the first sets 40 or the clutch teeth 62 of the second sets 60 of the central portion 30 of the housing 20, depending on the positioning of the clutch plate 100 in the central portion 30. In the illustrated embodiment, there are five sets of clutch teeth 102, but it is envisioned that any number of sets may be used. The clutch plates 100 may be formed from steel or other material.

As shown in FIG. 5, a friction disc 120 (or clutch disc) may be provided between each pair of adjacent clutch plates 100 such that the clutch plates 100 alternate with the friction discs 120. The friction discs 120 may also be connected (e.g., splined) to a rotating component of the transmission 10, such as a ring gear of a planetary gear set (not shown). The friction discs 120 may be formed from steel or other material. In the illustrated embodiment, three clutch plates 100 may engage the clutch teeth 62 of the second sets 60, but it is envisioned that any number of clutch plates 100 may be used, depending on, for example, the size of the clutch plates 100 and/or the friction discs 120, the size of the central portion 30, the desired clutch capacity or torque, etc.

The clutch plates 100 are capable of engaging the second sets 60 of the clutch teeth 62 along a first working length 80 of the respective clutch teeth 62, as shown in FIG. 3. The first working length 80 may span the distance along the clutch teeth 62 between and aligned with the topmost and bottommost clutch plates 100 that engage with the clutch teeth 62.

As shown in FIGS. 7 and 8, another friction disc 120 may be provided on top of the topmost clutch plate 100 that engages the clutch teeth 62 of the second sets 60. Then, multiple clutch plates 100 may be inserted into the central portion 30 of the housing 20 so that the respective clutch teeth 102 mesh with or engage the clutch teeth 42 of the first sets 40 in the central portion 30. The clutch plates 100 that engage with the clutch teeth 42 of the first sets 40 are rotated with respect to the clutch plates 100 that engage with the clutch teeth 62 of the second sets 60 in order to engage the different sets 40, 60 of the clutch teeth 42, 62. As a result, manufacturing costs may be reduced since the same or substantially similar clutch plates 100 may be used to engage with both the first sets 40 and the second sets 60 of the clutch teeth 42, 62.

As shown in FIG. 8, the friction discs 120 may also be provided between each pair of adjacent clutch plates 100 that engage the first sets 40 of the clutch teeth 42 such that the clutch plates 100 alternate with the friction discs 120. Although FIG. 8 shows two clutch plates 100, three or more clutch plates 100 may engage the clutch teeth 42 of the first sets 40. However, it is envisioned that any number of clutch plates 100 may be used, depending on, for example, the size of the clutch plates 100 and/or the friction discs 120, the size of the central portion 30, the desired clutch capacity or torque, etc.

The clutch plates 100 are capable of engaging the first sets 40 of the clutch teeth 42 along a second working length 82 of the respective clutch teeth 42, as shown in FIG. 3. The second working length 82 may span the distance along the clutch teeth 42 between and aligned with the topmost and bottommost clutch plates 100 that engage with the clutch teeth 42.

As shown in FIG. 3, the first and second working lengths 82, 80 of the respective clutch teeth 42, 62 may axially overlap over an axial overlap length 84. The extent of the axial overlap length 84 may depend, for example, on the respective working lengths 82, 80 of the clutch teeth 42, 62, the size of the clutch plates 100 and/or the friction discs 120, the size of the central portion 30, etc. Thus, a first portion of the second working length 82 may axially overlap the first working length 80, e.g., along the axial overlap length 84, and a second portion of the second working length 82 may be axially offset (e.g., does not overlap) from the first working length 80. Likewise, a first portion of the first working length 80 may axially overlap the second working length 82, e.g., along the axial overlap length 84, and a second portion of the first working length 80 may be axially offset (e.g., does not overlap) from the second working length 82.

One or more guide pins 110 may be attached to the central portion 30 of the housing 20, e.g., the wall 36, near the inner surface 32. A spring 112 or other biasing device may be positioned on each guide pin 110, as shown in FIGS. 4 and 7. The guide pins 110 and the springs 112 may inserted into the central portion 30 before inserting the clutch plates 100, as shown in FIGS. 5-8. The guide pins 110 may also be inserted through holes (not shown) in the outermost clutch plates 100 (e.g., the clutch plate 100 closest to the first axial end 31 of the central portion 30 and the clutch plate 100 closest to the second axial end 33 of the central portion 30), and the springs 112 may bias the outermost clutch plates 100 away from each other.

Also, when assembled, the guide pins 110 and the springs 112 may be disposed in a space 72 disposed between certain first sets 40 of the clutch teeth 42 and the adjacent second sets 60 of the clutch teeth 62. The spaces 72 may be wider than the other spaces provided between the individual clutch teeth 42, 62. Each space 72 may be bound circumferentially on one side by a side surface of one of the clutch teeth 42 and on an opposite side by a side surface of one of the clutch teeth 62 that faces the particular clutch tooth 42. As shown in FIGS. 4 and 7, the transmission 10 may include five guide pins 110 and five springs 112 equally spaced around the circumference of the inner surface 32 of the housing 20 in respective spaces 72, but it is envisioned that any number of guide pins 110 and springs 112 may be used.

All of the clutch plates 100 disposed in the central portion 30 may be substantially similar or identical. For example, in the illustrated embodiment, all of the clutch plates 100 are substantially similar since they include sets of the clutch teeth 102 that are similar in size, numbering, location, etc., but the outermost clutch plates 100 may differ from the remaining clutch plates 100 by having through holes for inserting the guide pins 110. Alternatively, the clutch plates 100 disposed in the central portion 30 may vary by having clutch teeth 102 that are different in size, numbering, location, etc. As another alternative, the clutch plates 100 that engage with the clutch teeth 42 of the first sets 40 may be substantially similar, but may be different from the clutch plates 100 that engage with the clutch teeth 62 of the second sets 60. Likewise, the clutch plates 100 that engage with the clutch teeth 62 of the second sets 60 may be substantially similar, but may be different from the clutch plates 100 that engage with the clutch teeth 42 of the first sets 40.

The clutch plates 100 and the friction discs 120 disposed in the central portion 30 may form a clutch assembly (or brake assembly). The spaces between the neighboring first sets 40 of the clutch teeth 42 (and/or between the neighboring sets 60 of the clutch teeth 62) may include oil drain passages (not shown) configured to receive draining oil for the clutch assembly. Hydraulic fluid delivered to the clutch assembly may be drained at a predetermined rate from the clutch assembly into the oil drain passages. Optionally, the transmission 10 may also include additional components, such as seals, bolts, gaskets, etc.

Industrial Applicability

The disclosed housing may be applicable to any transmission that includes a clutch assembly or brake assembly. The disclosed housing may also be provided for other applications in which a housing including cast-in splines, such as clutch or brake splines, may be used. The operation of the transmission 10 will now be described.

To actuate the clutch assembly, according to an embodiment, pressurized hydraulic fluid from a pump (not shown) may be provided to cause a piston (not shown) to press against at least one of the outermost clutch plates 100, e.g., the clutch plate 100 closest to the first axial end 31 of the central portion 30 and/or the clutch plate 100 closest to the second axial end 33 of the central portion 30. The outermost clutch plate(s) 100 press the other clutch plates 100 in the clutch assembly against the friction discs 120 separating the clutch plates 100. Before engagement, the friction discs 120 may rotate since the friction discs 120 are connected to a rotating component of the transmission, such as a ring gear (not shown). At substantial engagement of the clutch plates 100 with the friction discs 120, the clutch plates 100, which are engaged with the housing 30 via the clutch teeth 42, 62, are held to the friction discs 120 such that the rotating component (e.g., the ring gear) connected to the friction discs 120 may be prevented from rotating, thereby locking the rotating component. The clutch plates 100 may be disengaged from the friction discs 120 by stopping and draining the flow of the fluid to the piston, thereby releasing the pressure against the outermost clutch plate 100. The springs 112 positioned between the outermost clutch plates 100 may bias the outermost clutch plates 100 away from each other, thereby allowing the friction discs 120 and the rotating component to rotate. Thus, the springs 112 may serve as an actuator retraction member.

Several advantages over the prior art may be associated with the transmission 10 including the housing 20. For example, forming the clutch teeth 42, 62 with the axial draft and/or the radial draft may allow the central portion 30 of the housing 20 to be formed by casting without having to use a complex or expensive mold since the axial draft and/or the radial draft may allow the mold to be removed from the cast part (e.g., the central portion 30) more easily.

For example, in the illustrated embodiment, a plug (not shown) may be used to form the clutch teeth 42, 62 of the central portion 30 during the casting process. During casting, portions of the plug may be disposed in the spaces between the individual clutch teeth 42, 62. To remove the plug, the plug may be pulled from the central portion 30 along the axial direction towards the first axial end 31 of the central portion 30. In the illustrated embodiment, the clutch teeth 42, 62 are formed with the axial draft such that the clutch teeth 42, 62 are tapered along the axial direction and therefore do not have a constant cross-section along the axial direction. In addition, in the illustrated embodiment, the clutch teeth 42, 62 are formed with the radial draft such that the clutch teeth 42, 62 are tapered along the radial direction and therefore do not have a constant cross-section along the radial direction. The tapering (e.g., the axial draft and/or the radial draft) may allow the plug to be released or removed axially from the cast part more easily. For example, with the axial draft, the side surfaces of the clutch teeth 42, 62 are angled (not parallel) in the axial direction, with the clutch teeth 42, 62 narrowing along the direction of removal of the plug. This axial draft allows the plug to be removed axially from the cast part more easily as the plug is moved axially in the direction of the narrowing of the clutch teeth 42, 62. With the radial draft, the side surfaces of the clutch teeth 42, 62 are angled (not parallel) in the radial direction, with the clutch teeth 42, 62 narrowing towards the axis 26 of the central portion 30.

In addition, the exemplary central portion 30 may be formed using a single-piece plug. The plug may be removed axially from the cast part without requiring a complicated and costly design for the plug, such as forming the plug with retractable or collapsible sections that allow the plug to retract or collapse radially inward in order to be removed axially from the cast part, as provided for certain conventional transmission housings.

Further, the clutch teeth 42, 62 are formed in sets 40, 60 such that the first sets 40 are staggered with the second sets 60 and such that the first sets 40 axially overlap the second sets 60. The clutch teeth 42, 62 may not be formed to extend along the entire axial length of the central portion 30 (or a majority thereof). Instead, there are at least two rows of clutch teeth that extend at least partially circumferentially around the central portion 30. One row may include the first sets 40 of the clutch teeth 42, and another row may include the second sets 60 of the clutch teeth 62. The clutch teeth 42 of the first sets 40 extend between the first axial ends 44 and the second axial ends 46, and the clutch teeth 62 of the second sets 60 extend between the first axial ends 64 and the second axial ends 66. As a result, the respective axial lengths of the clutch teeth 42, 62 are significantly shorter than if the clutch teeth were formed to extend along substantially the entire axial length of the central portion 30 (or a majority thereof).

Since the lengths of the clutch teeth 42, 62 are relatively shorter than substantially the entire length of the central portion 30 (or a majority thereof), it is not necessary to provide as great a change in width of the clutch teeth 42, 62 along the axial length thereof due to the axial draft. For example, the change in width of the clutch teeth 42, 62 due to the axial draft (e.g., the difference in width at the first axial end 44, 64 compared to the second axial end 46, 66, the difference in width at one end of the working length 80, 82 compared to the opposite end of the respective working length 80, 82, etc.) may be minimized, e.g., approximately 3 millimeters or less. Without providing the clutch teeth 42, 62 in staggered sets 40, 60 that axially overlap, the clutch teeth 42, 62 may require a greater change in width due to the axial draft. Such a greater change may result in significantly larger spaces between the individual clutch teeth 42, 62 at one end 44, 64 and significantly smaller spaces between the individual clutch teeth 42, 62 at the opposite end 46, 66. Since the clutch teeth 102 of the clutch plates 100 that engage with the clutch teeth 42, 62 of the central portion 30 have generally equal dimensions regardless of where the clutch plate 100 is positioned along the lengths of the clutch teeth 42, 62, there may be more slop (e.g., excess space) separating the clutch teeth 102 from the clutch teeth 42, 62 where there are larger spaces separating the individual clutch teeth 42, 62. Accordingly, providing the clutch teeth 42, 62 in staggered sets 40, 60 that axially overlap may reduce the amount of slop separating the clutch teeth 102 from the clutch teeth 42, 62, thereby reducing the variation in geometry of the clutch teeth 42, 62 along the axial length, which may improve the operation of the transmission 10. Accordingly, axial variation of the width of the clutch teeth 42, 62 may be reduced, e.g., by half. Also, providing relatively shorter clutch teeth 42, 62 (along the axial direction) may allow the plug to be removed more easily from the cast central portion 30 during the manufacturing process and may allow the central portion 30 to be more compact, particularly along the axial direction.

The geometry (e.g., the working length 82, the length along the axial direction, the width along the circumferential direction, the height along the radial direction, etc.) of the clutch teeth 42 of the first sets 40 may be generally similar to the geometry (e.g., the working length 80, the length along the axial direction, the width along the circumferential direction, the height along the radial direction, etc.) of the clutch teeth 62 of the second sets 60. Accordingly, the same clutch plates 100 may be provided to engage with both the clutch teeth 42 of the first sets 40 and the clutch teeth 62 of the second sets 60. This may decrease manufacturing costs and simplify the manufacturing process.

It will be apparent to those skilled in the art that various modifications and variations can be made to the disclosed transmission. Other embodiments will be apparent to those skilled in the art from consideration of the specification and practice of the disclosed transmission. It is intended that the specification and examples be considered as exemplary only, with a true scope being indicated by the following claims and their equivalents.

What is claimed is:

1. A transmission housing comprising:
   an inner surface;
   circumferentially spaced first sets of teeth spaced about an axis of the transmission housing and configured to selectively engage a first clutch plate, each first set attached to the inner surface; and
   circumferentially spaced second sets of teeth spaced about the axis of the transmission housing and configured to selectively engage a second clutch plate, each second set attached to the inner surface;
   wherein a length of at least one set of the first sets of teeth partially overlaps a length of at least one set of the second sets of teeth along a length direction of the housing, and the teeth of at least one set of the first or second sets extend axially and are narrower at a first axial end of the respective teeth than at a second axial end of the respective teeth.

2. The transmission housing of claim 1, wherein the teeth of at least one of the first or second sets are continuously tapered between the first axial end and the second axial end of the respective teeth.

3. The transmission housing of claim 1, wherein the teeth of at least one of the first or second sets are wider at a first radial location closer to the inner surface than at a second radial location farther from the inner surface than the first radial location.

4. The transmission housing of claim 1, wherein each first set includes a first axial portion that axially overlaps at least one of the second sets and a second axial portion that is axially offset from the second sets.

5. The transmission housing of claim 1, wherein the teeth of each second set include a first axial portion that is axially offset from the teeth of the first sets and a second axial portion that axially overlaps at least one of the teeth of the first sets.

6. The transmission housing of claim 1, wherein the first sets alternate with the second sets.

7. The transmission housing of claim 1, wherein each first set and each second set is integrally attached to the inner surface.

8. The transmission housing of claim 1, further comprising spaces separating the individual teeth of the first sets and the individual teeth of the second sets, each space extending axially and being narrower at a first axial end of the respective space than at a second axial end of the respective space.

9. The transmission housing of claim 1, further comprising spaces separating the individual teeth of the first sets and the individual teeth of the second sets, wherein:
   the transmission housing includes a first end and a second end;
   the narrower first axial end of each respective space is closer to the first end of the transmission housing than the second axial end of each respective space; and
   each space tapers continuously between the first axial end and the second axial end.

10. The transmission housing of claim 1, wherein further comprising spaces separating the individual teeth of the first sets and the individual teeth of the second sets, each space extending radially and being narrower at a first radial location closer to the inner surface than at a second radial location farther from the inner surface than the first radial location.

11. The transmission housing of claim 1, wherein:
    the transmission housing includes a first end and a second end;
    the first axial ends and the second axial ends of the teeth of the first sets are separated by respective first axial lengths;
    the first axial ends and the second axial ends of the teeth of the second sets are separated by respective second axial lengths;
    the first axial ends of the teeth of the first sets are closer to the first end of the transmission housing than the first axial ends of the teeth of the second sets; and
    the second axial ends of the teeth of the second sets are closer to the second end of the transmission housing than the second axial ends of the teeth of the first sets.

12. The transmission housing of claim 1, wherein the first end of the first sets of teeth and the second end of the second sets of teeth are separated by a third axial length that is less than the sum of the first and second axial lengths.

13. A transmission comprising:
    a clutch assembly including at least one first clutch plate and at least one second clutch plate; and
    a housing with a first end, a second end, and an axis, the housing comprising:
       an inner surface,
       circumferentially spaced first sets of teeth spaced about the axis of the housing and configured to selectively engage the at least one first clutch plate, each first set being integrally attached to the inner surface, and
       circumferentially spaced second sets of teeth spaced about the axis of the housing and configured to selectively engage the at least one second clutch plate, each second set being integrally attached to the inner surface;
    wherein a length of at least one set of the first sets of teeth partially overlaps a length of at least one set of the second sets of teeth along a length direction of the housing, and the teeth of at least one of the first or second sets extend axially and include at least a portion that is tapered along the axial direction.

14. The transmission of claim 13, wherein the teeth of at least one of the first or second sets are continuously tapered between a first axial end and a second axial end of the respective teeth.

15. The transmission of claim 13, wherein:
    each first set includes a first end and a second end closer to the second end of the housing than the first end of the respective first set; and
    each second end of the first sets of teeth includes a portion that axially overlaps a portion of at least one first end of the second sets of teeth.

16. The transmission of claim 13, wherein the teeth of the at least one of the first or second sets extend radially and include at least a portion that is tapered along the radial direction to be wider at a first radial location closer to the inner surface than at a second radial location farther from the inner surface than the first radial location.

17. The transmission of claim 13, wherein:
    the at least one first clutch plate and the at least one second clutch plate each include clutch teeth that intermesh the teeth of the respective first and second sets of teeth;
    the transmission further includes at least one disc connected to a rotatable component of at least one planetary gear set and disposed between the at least one first clutch plate and the at least one second clutch plate; and
    the transmission housing further comprises:
       an actuator operative to apply a pressure against at least one of the first and second clutch plates to engage the at least one of the first and second clutch plates with the at least one disc to reduce movement of the rotatable component; and at least one actuator retraction member configured to disengage the at least one of the first and second clutch plates from the at least one disc to allow movement of the rotatable component.

18. A method of assembling a transmission having a transmission housing with an inner surface, the method comprising:

forming circumferentially spaced first sets of teeth spaced about an axis of the transmission housing and configured to selectively engage at least one first clutch plate, each first set integrally attached to the inner surface of the transmission housing; and forming circumferentially spaced second sets of teeth spaced about the axis of the transmission housing and configured to selectively engage at least one second clutch plate, each second set integrally attached to the inner surface, wherein a length of at least one set of the first sets of teeth partially overlaps a length of at least one set of the second sets of teeth along a length direction of the housing, and the teeth of at least one of the first or second sets being, wider at a first axial location than at a second axial location that is offset axially from the first axial location.

19. The method according to claim 18, wherein:
each first set axially overlapping at least one of the second sets; and
the teeth of the at least one of the first or second sets are wider at a first radial location closer to the inner surface than at a second radial location farther from the inner surface than the first radial location.

20. The method according to claim 18, wherein the teeth of at least one of the first or second sets are continuously tapered between the first axial location and the second axial location.

* * * * *